United States Patent [19]

Krizik

[11] 4,145,004

[45] Mar. 20, 1979

[54] SHOWERHEADS

[75] Inventor: Jan G. Krizik, Wellesley, Mass.

[73] Assignee: IDR Enterprises, Inc., Needham, Mass.

[21] Appl. No.: 841,829

[22] Filed: Oct. 13, 1977

[51] Int. Cl.$^2$ .......................... B05B 1/18; B05B 1/26; F16K 5/06

[52] U.S. Cl. ................................ 239/499; 137/625.3; 137/625.31; 239/540; 239/563; 239/579; 251/350; 251/352; 285/261

[58] Field of Search ................ 285/261; 251/350, 352; 137/625.3, 625.31; 138/43, 46; 239/396, 397, 436, 442, 499, 537, 538, 540, 562–564, 569, 579, 587, 437

[56] References Cited

U.S. PATENT DOCUMENTS

| | | | |
|---|---|---|---|
| 514,952 | 2/1894 | Merrifield | 239/562 X |
| 3,103,941 | 9/1963 | Watters | 137/625.31 X |
| 3,358,934 | 12/1967 | Moen | 239/443 |
| 3,713,587 | 1/1973 | Carson | 239/447 X |
| 3,762,682 | 10/1973 | Tranck | 251/315 X |
| 3,788,553 | 1/1974 | Heckman | 239/540 X |
| 3,831,860 | 8/1974 | Gullaksen et al. | 239/590.3 |
| 3,902,671 | 9/1975 | Symmons | 239/537 X |
| 3,998,390 | 12/1976 | Peterson et al. | 239/443 X |

FOREIGN PATENT DOCUMENTS

| | | | |
|---|---|---|---|
| 192084 | 1/1924 | United Kingdom | 239/587 |

*Primary Examiner*—Robert B. Reeves
*Assistant Examiner*—Andres Kashnikow

[57] ABSTRACT

A showerhead of the type including an inlet end, an outlet end, and a bore defining a passage between the two. Two discs are disposed in the passage, in face-to-face engagement with each other and mounted for relative rotation about a central axis. A plurality of orifices, arranged with their centers spaced at regular intervals around a circle of predetermined diameter, extend through each disc. Each orifice of the downstream disc defines a small port at the downstream face and a large port at the upstream face of the disc. Each orifice through the upstream disc defines at its downstream face a port that communicates with but is smaller than a respective port at upstream face of the downstream disc.

8 Claims, 10 Drawing Figures

FIG 1
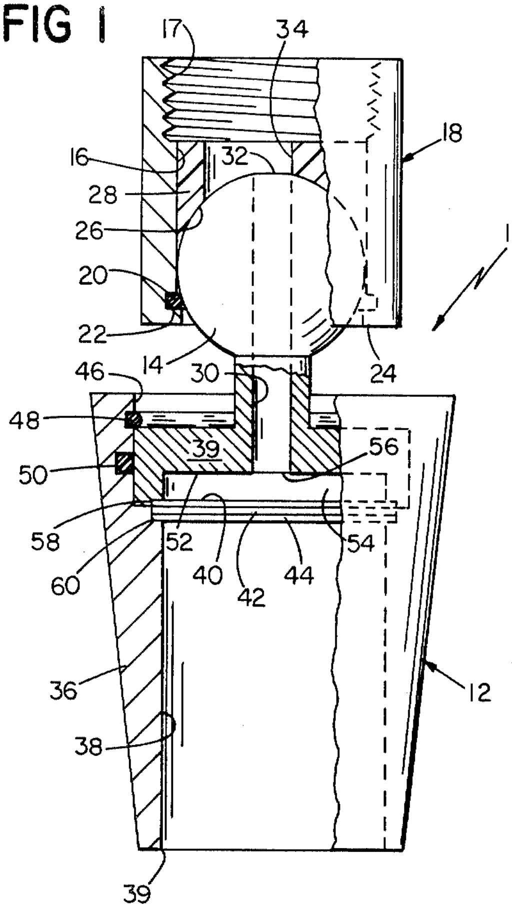
FIG 2
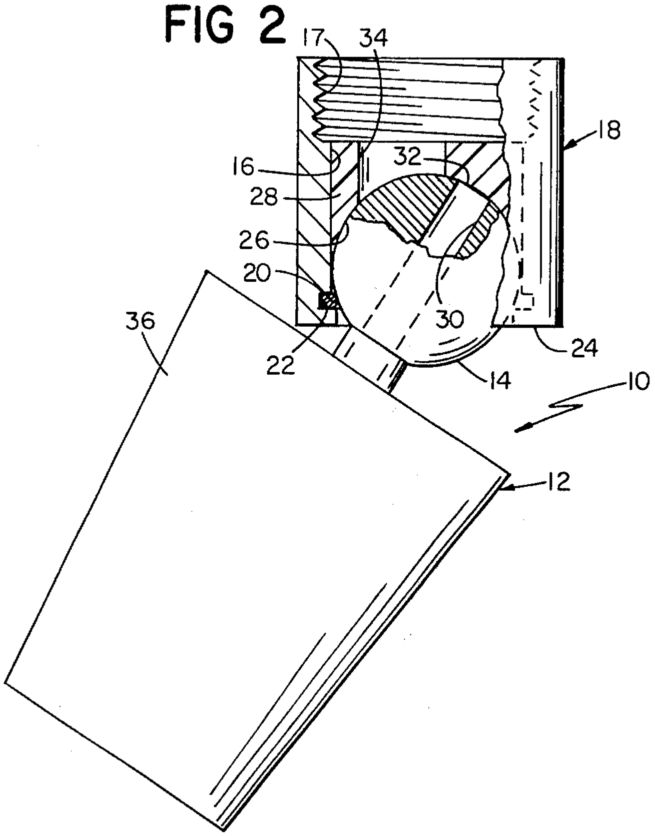
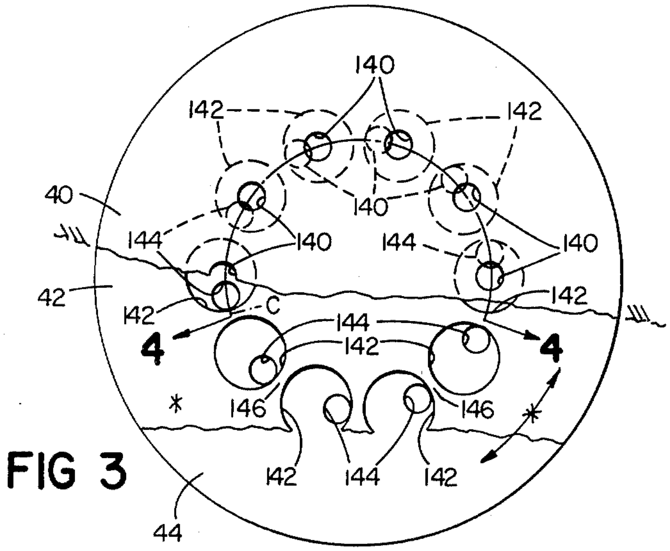
FIG 3
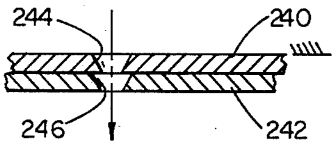
FIG 9
FIG 10
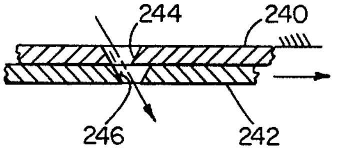
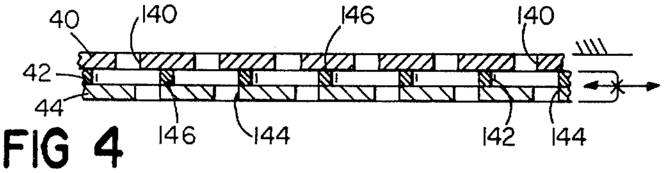
FIG 4

SHOWERHEADS

This invention relates to showerheads.

It is a principal object of the present invention to provide a simple showerhead that saves hot water and is easily adjusted to provide a variety of types of flows, ranging from a hard cylindrical jet to soft conical spray. Other objects include providing such a showerhead that is simply adjusted between full flow and shut-off, and provides both steady and pulsating flow.

The invention is featured in a showerhead of the type including an inlet end, an outlet end, and a bore defining a passage between the two. Two discs are disposed in the passage, in face-to-face engagement with each other and mounted for relative rotation about a central axis. A plurality of orifices, arranged with their centers spaced at regular intervals around a circle of predetermined diameter, extend through each disc. Each orifice of the downstream disc defines a small port at the downstream face and a large port at the upstream face of the disc. Each orifice through the upstream disc defines at its downstream face a port that communicates with but is smaller than a respective port at upstream face of the downstream disc. In preferred embodiments in which the showerhead includes a ball swivel engaging a hemispherical surface in a socket, a port in the hemispherical surface is arranged to communicate with a flow passage through the ball when the ball and socket are in one relative configuration and the hemispherical surface overlies and seals the ball flow passage when the ball and socket are in a second relative configuration, the orifices in the discs are circular in cross-section parallel to the disc axes, the downstream disc includes two disc members fixed together in face-to-face relationship, the downstream one of the members has orifices therethrough of diameter equal to that of the upper disc's downstream ports, the upstream of the disc members has orifices of diameter equal to about twice that of those of the downstream disc member, and the periphery of each orifice of the upstream disc member is tangent to that of an orifice of the downstream disc member.

Other objects, features and advantages will appear from the following detailed description of the invention, taken together with the attached drawing in which:

FIGS. 1 and 2 are plan views, partially in section, of a showerhead embodying the invention;

FIG. 3 is a plan view, partially away, of the disc assembly of the showerhead of FIG. 1;

FIG. 4 is a sectional view taken at line 4—4 of FIG. 3.

FIGS. 9–10 are sectional views illustrating the operation of a modified disc assembly for the showerhead of FIG. 1.

Figure 5:
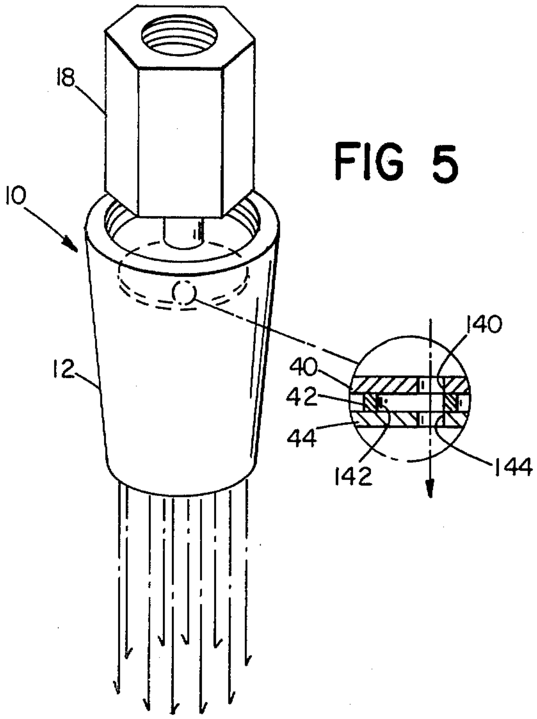
FIGS. 5–8 are schematic views illustrating the operation of the showerhead of FIG. 1.

Referring now to FIGS. 1–8 of the drawings, there is shown a showerhead, generally designated 10, including a body assembly 12 having a ball swivel 14 fitted within the central bore 16 of a connector 18. The upper end portion 17 of bore 16 is threaded for connection to a shower inlet pipe (not shown). The lower portion of bore 16 has a cylindrical inner surface of diameter slightly greater than, for receiving and forming a close slip fit with, ball swivel 14. A retainer wire 20 is fitted within an annular recess 22 in the cylindrical wall of ball 16 and engages the outer spherical surface of ball swivel 14 along a circle below and parallel to the great circle of the ball in contact with bore 16. The upper, slightly less than hemispherical, surface of ball swivel 14 is fitted within and compressively engages a substantially hemispherical recess 26 in the bottom of a cylindrical rubber sleeve 28 which is fitted tightly in bore 16 below threaded portion 17.

A drilled water passage 30 extends axially through ball swivel 14, terminating in a port 32 at the top of the swivel. The diameter of passage 30 is less than one-third, typically, about one-fourth, that of ball swivel 14. Rubber sleeve 28 includes a cylindrical passage 34 of diameter not less than, and as shown about twice, that of ball passage 30 passing axially through but offset from the axis of sleeve 28. When ball swivel 14 is positioned with the axis of passage 30 parallel to that of connector 18 and sleeve 28 (as shown in FIG. 1), passage port 32 is within and substantially tangent to the cylindrical wall of sleeve passage 34. When the ball swivel is pivoted relative to connector 18 (as shown in FIG. 2) the hemispherical lower surface of sleeve 28 overlies and seals port 30 and prevents water flow from the shower inlet pipe through connector 18 to the showerhead body assembly 12. Pivoting the ball swivel 14 to an intermediate position, in which seal 28 only partially overlies port 30, will reduce but not entirely cut off the water flow.

Body assembly 12 includes an elongated tubular body 36, the exterior of which is typically tapered for esthetic purposes, having a central axially-extending bore 38 therethrough. A closure or plug 39 attached to ball swivel 14 fits in the upper end of bore 38, and a set of discs 40, 42, 44 is mounted below plug 39 with the discs in face-to-face engagement with each other. Plug 39 is positioned in a cylindrical counterbore 46 in the top of body 36 and forms a tight slip fit with the body so that the plug and body can be rotated relative to each other. A snap ring retainer 48 fits partially into an annular recess in the wall of counterbore 46 to hold plug 39 in place, and leakage between the plug and counterbore wall is prevented by an O-ring seal 50.

As shown, the bottom 52 of plug 39 defines a cylindrical recess of diameter equal to that of bore 38 forming a chamber 54 between the bottom of the plug 39 and the top of disc 40, and a counterbore 58 at the periphery of the recess in which disc 40 is soldered. The bottom of water passage 30 terminates in a port 56 at the top of chamber 54.

Discs 42 and 44 are spot-welded together and thus effectively comprise a single unitary member. The two discs fit into, and are soldered in place in, a counterbore 60 in body 36 coaxial with disc 40 and bore 38. Rotation of body 36 relative to plug 39 will cause the two discs 42, 44 to rotate with body 36 as a unit relative to top disc 40 which rotates with plug 39. The vertical height of counterbore 60 is such that the upper surface of disc 42 is in close face-to-face engagement and forms a slip fit with the bottom surface of disc 40.

Referring now particularly to FIGS. 3 and 4, each of discs 40, 42, 44 includes ten drilled holes, designated 140, 142, 144 respectively, extending through the respective disc with their centers regularly spaced at 36° intervals around a circle C coaxial with the center of the disc and bore 38. The only difference between the disc is in the size of the drilled holes. The holes 142 through center disc 42 are the largest, being so sized that the edges of adjacent holes are closely adjacent and leave only a narrow web 146 between adjacent holes. Holes 140, 144 through discs 40, 44 are of equal size, and are smaller than holes 142. In the illustrated embodiment the diameter of holes 140 and 144 is 0.052 in. (No. 55 drill); and that of holes 142 is 0.110 in. (No. 35 drill). In other embodiments, the diameter of holes 140 and 144 may be in the range of about ¼ to about ⅝ that of holes 142. In any event, holes 140 restrict the flow from connector 18, and the sum of their areas should not exceed the cross-sectional area of ball passage 30. The maximum size of holes 142 depends principally on the number of holes spaced around circle C and on the width of web 146 necessary for structural integrity. Holes 144 may be the same size as or somewhat larger than holes 140.

As best shown in FIG. 3, discs 42 and 44 are fixed to each other, typically by spot-welding, with each of holes 144 within the bounds of, and its peripheral edge substantially tangent to the periphery of, a respective hole 142. Disc 40 is mounted coaxially on top of disc 44, as previously discussed, and discs 42 and 44 may be rotated relative to it by grasping and rotating tubular body 36.

Figure 6:
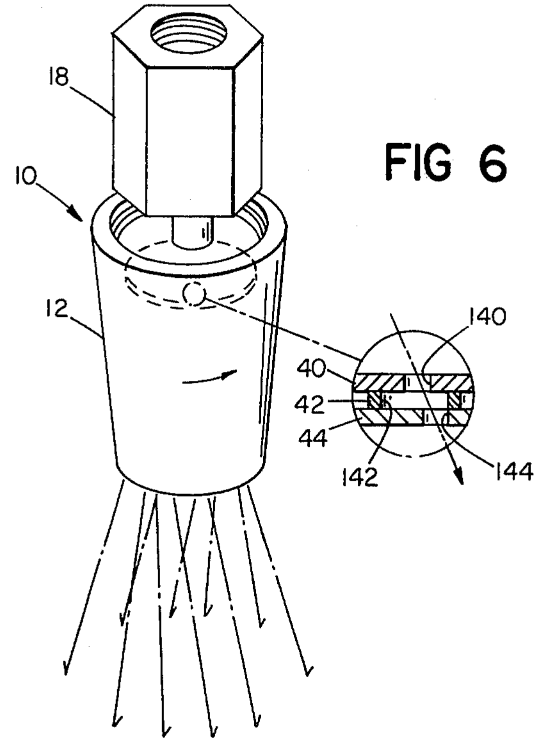
Figure 7:
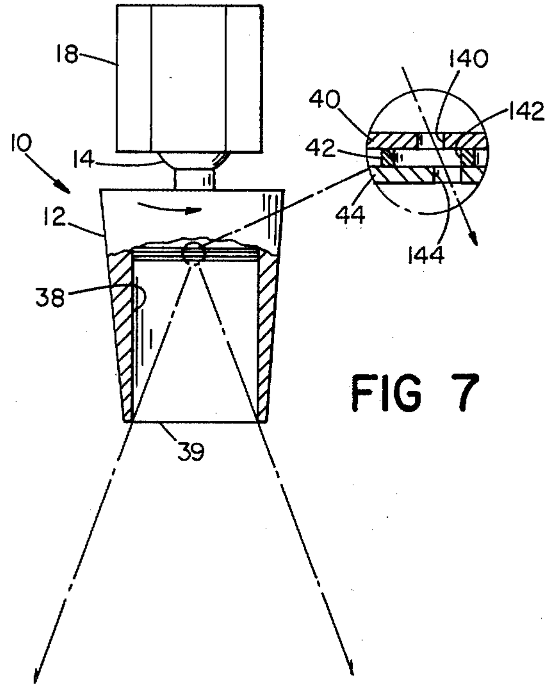
Figure 8:
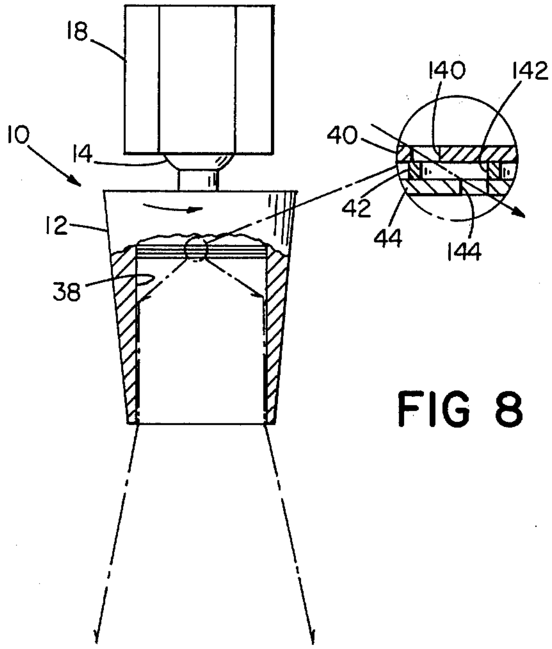

As shown in FIGS. 5–8, relative rotation of disc 40 and discs 42, 44 changes the position of holes 140 relative to that of holes 142, 144 and causes a corresponding change in the type of spray emitted from showerhead 10. When the discs are positioned as shown in FIG. 5, with holes 140 and 144 in axial alignment, the spray jets from showerhead 10 form a tight cylinder of diameter about equal to that of the circle of holes 144 in disc 20. As discs 40 and 42 are rotated relative to each other, as shown in FIGS. 6–8, each hole 140 of disc 40 moves generally diametrically over a respective hole 142 in center disc 42, and the water jet flowing through each set of three holes 140, 142, 144 forms an ever increasing angle to the central axis of the showerhead. Initially, the configuration of the spray changes from the tight cylinder of FIG. 5 to the broader cone shown in FIGS. 6 and 7 in which the jet from each set of disc holes is substantially tangent to the inside bottom edge 41 of the wall of bore 38. If the discs 40 and 42 are then further rotated, the jet from each set of holes will impinge on the inner wall of bore 38, as shown in FIG. 8, the water flow will be highly aerated, and the flow exiting from the nozzle will become a softer conical spray. In the illustrated embodiment, the width of the web 146 between adjacent holes 142 in plate 42 is less than the diameter of holes 140. Thus, as disc 40 is rotated relative to discs 42 and 44 the spray is only partially cut off when holes 140 pass over web 146. In other embodiments, the web width may be greater than the diameter of holes 140, and flow may be entirely cut off.

FIGS. 9 and 10 illustrate a modified structure including a two-disc system that may be used in lieu of three-disc system of FIGS. 1–8. The two discs 240, 242 shown in FIGS. 9 and 10 are identical. Each includes a plurality of frusto-conical holes 244, 246, respectively, extending axially therethrough. As with discs 40, 42 and 44, the centers of holes 244, 246 are regularly spaced about respective coaxial circles of the same diameter, disc 24 is fixed in counterbore 50 and rotates with plug 39, and disc 242 is fixed in counterbore 60 or body 38. The diameter of the port at the top of each hole 244, 246 is about twice that of the port at its bottom. As the discs are rotated relative to each other, with the bottom port of the hole 244 within the bounds of the upper port of a respective hole 246, the resulting spray pattern will change from a tight cylinder of jets (when the holes are in axial alignment as in FIG. 9) to an aerated cone (when they are offset as in FIG. 10). In some relative positions of the two discs, the flow through the nozzle pulsates.

As should be evident, the three-disc system of FIGS. 1–8 is somewhat less expensive to manufacture than is the two-disc system of FIGS. 9–10. In both systems, however, the disc assembly includes two relatively rotatable disc sections, the lower one of which (disc 242 or the effectively unitary combination of relatively-fixed discs 42 and 44) has a plurality holes therethrough each of which defines a top port significantly larger than either its bottom port or the overlying port in the bottom of the respective upper one of the discs, 40, 240.

Other embodiments will be within the scope of the following claims.

What is claimed is:

1. In a showerhead comprising a body having an inlet end adapted to be connected to a source of liquid under pressure, a liquid outlet end spaced from said inlet end, and a bore defining a passage extending between said inlet and outlet ends, that improvement comprising:

a pair of discs disposed in said passage in close face-to-face relationship with each other for controlling the flow of liquid through said passage, said discs being mounted for rotation relative to each other about an axis generally perpendicular to the faces of said discs;

each of said discs including a plurality of orifices extending therethrough and arranged at regular intervals around a respective circle of predetermined diameter such that the port defined by each orifice of the upstream one of said discs at the downstream face thereof communicates with a respective port defined by an orifice of the downstream one of said discs at the upstream face thereof;

each of said ports at the upstream face of said downstream disc being of greater area than the respective port at the downstream face of said upstream disc communicating therewith;

each of the orifices of the downstream one of said discs defining a port at the downstream surface thereof of smaller area than that of the said port defined thereby at the upstream surface thereof;

said downstream disc comprising a pair of disc members fixed with respect to each other in face-to-face relationship, each of said disc members defining a portion of each of said orifices through said downstream disc, and said orifice portions of each of said disc members being arranged at regular intervals around a circle of said predetermined diameter;

each of said orifice portions and each of said orifices through said upstream disc being generally circular in cross-section perpendicular to said axis, and the diameter of the orifice portions defined by the downstream one of said disc members being not less than that of the orifice portions of said upstream disc; and said members being fixed to each other such that the periphery of each orifice portion defined by one of said disc members is substantially tangent to the periphery of an orifice portion definded by the other of said disc members.

2. The showerhead of claim 1 wherein each of said discs defines the same number of said orifices.

3. The showerhead of claim 1 wherein the diameter of each port at the downstream surface of said upstream disc is in the range of about one-fourth to about two-thirds that of the port at the upstream surface of said downstream disc communicating therewith.

4. The showerhead of claim 1 wherein each of said ports at the downstream face of said upstream disc is of a predetermined first diameter, each of said ports at the upstream face of said downstream disc is of a predetermined second diameter, said first predetermined diameter being in the range of about one-fourth to two thirds said second predetermined diameter.

5. In a showerhead comprising a body having an inlet end adapted to be connected to a source of liquid under pressure, a liquid outlet end spaced from said inlet end, and a bore defining a passage extending between said inlet and outlet ends, that improvement comprising:

a pair of discs disposed in said passage in close face-to-face relationship with each other for controlling the flow of liquid through said passage, said discs being mounted for rotation relative to each other about an axis generally perpendicular to the faces of said discs, each of said discs including a plurality of orifices extending therethrough and arranged at regular intervals around a respective circle of predetermined diameter such that the port defined by each orifice of the upstream one of said discs at the downstream face thereof communicates with a respective port defined by an orifice of the downstream one of said discs at the upstream face thereof;

each of said ports at the upstream face of said downstream disc being of greater area than the respective port at the downstream face of said upstream disc communicating therewith, and each of the orifices of the downstream one of said discs defining a port at the downstream surface thereof of smaller area than that of the said port defined thereby at the upstream surface thereof;

a ball swivel fitted within a socket and engaging a generally hemispherical surface of diameter substantially equal to that of the ball swivel, a first water passage portion extending generally diametrically through said ball swivel and defining a port of predetermined diameter at the outer surface thereof, and a second water passage portion extending through said socket and defining at said hemispherical surface a port of area greater than that of said port at said surface of said swivel, said swivel being rotatable relative to said socket between a first position in which said water passage ports are in communication with each other and a second position in which said hemispherical surface overlies and seals said water passage port of said ball swivel;

an elastomeric sleeve fitted within a cylindrical cavity of diameter substantially equal to that of said ball swivel, said sleeve defining said hemispherical surface and including a cylindrical passage of diameter greater than that of said port at the surface of said ball swivel extending through said sleeve generally parallel to the axis of said cavity and defining said port at said hemispherical surface; and, 6. The showerhead of claim 5 wherein the diameter of said cylindrical passage is about twice that of said water passage port of said ball swivel.

7. The showerhead of claim 5 wherein the cross-sectional area of said second water passage portion is not less than that of the sum of minimum areas of the orifices through the upstream one of said discs.

8. A showerhead including a ball swivel fitted within a socket and engaging a generally hemispherical surface of diameter substantially equal to that of the ball swivel, a first water passage portion extending generally diametrically through said ball swivel and defining a port of predetermined diameter at the outer surface thereof, a second water passage portion extending through said socket and defining at said hemispherical surface a port of area greater than that of said port at said surface of said swivel, and an elastomeric sleeve fitted within a cylindrical cavity of diameter substantially equal to that of said ball swivel, said sleeve defining said hemispherical surface and including a cylindrical passage of diameter greater than that of said port at the surface of said ball swivel extending through said sleeve generally parallel to the axis of said cavity and defining said port at said hemispherical surface, the axis of said cylindrical passage being offset from that of said cavity, and said swivel being rotatable relative to said socket between a first position in which said water passage ports are in communication with each other and a second position in which said hemispherical surface overlies and seals said water passage port of said ball swivel.

* * * * *